US010009773B2

(12) United States Patent
Smith et al.

(10) Patent No.: US 10,009,773 B2
(45) Date of Patent: Jun. 26, 2018

(54) SECURED DATA ACCESS FROM A MOBILE DEVICE EXECUTING A NATIVE MOBILE APPLICATION AND A HEADLESS BROWSER

(71) Applicant: AppBrilliance, Inc., Dripping Springs, TX (US)

(72) Inventors: Charles Eric Smith, Dripping Springs, TX (US); Chris Dutrow, Laurel, MD (US); Sergio Ayestaran, Burzaco (AR)

(73) Assignee: AppBrilliance, Inc., Dripping Springs, TX (US)

( * ) Notice: Subject to any disclaimer, the term of this patent is extended or adjusted under 35 U.S.C. 154(b) by 0 days. days.

(21) Appl. No.: 15/474,981

(22) Filed: Mar. 30, 2017

(65) Prior Publication Data

US 2017/0289809 A1    Oct. 5, 2017

Related U.S. Application Data

(60) Provisional application No. 62/316,373, filed on Mar. 31, 2016.

(51) Int. Cl.
| | |
|---|---|
| *H04W 12/08* | (2009.01) |
| *H04L 29/06* | (2006.01) |
| *H04W 12/06* | (2009.01) |
| *G06Q 40/02* | (2012.01) |
| *H04B 1/3827* | (2015.01) |
| *H04L 29/08* | (2006.01) |

(52) U.S. Cl.
CPC ............ *H04W 12/08* (2013.01); *G06Q 40/02* (2013.01); *H04B 1/3827* (2013.01); *H04L 63/168* (2013.01); *H04W 12/06* (2013.01); *H04L 67/02* (2013.01)

(58) Field of Classification Search
CPC .... H04W 12/08; H04W 12/06; H04L 63/168; H04L 67/02; G06Q 40/02; H04B 1/3827
See application file for complete search history.

(56) References Cited

U.S. PATENT DOCUMENTS

| | | | |
|---|---|---|---|
| 7,885,870 B2 | 2/2011 | Nam et al. | |
| 8,332,272 B2 | 12/2012 | Fisher | |
| 9,129,340 B1 | 9/2015 | Medina, III et al. | |
| 9,177,316 B2 | 11/2015 | Rao | |
| 2011/0119601 A1* | 5/2011 | Knothe | G06F 8/38 |
| | | | 715/760 |
| 2011/0252305 A1 | 10/2011 | Tschani et al. | |
| 2013/0246261 A1 | 9/2013 | Purves et al. | |
| 2013/0346302 A1* | 12/2013 | Purves | G06Q 20/102 |
| | | | 705/40 |
| 2015/0019944 A1 | 1/2015 | Kalgi | |
| 2015/0073959 A1* | 3/2015 | Connors | G06Q 40/00 |
| | | | 705/35 |
| 2015/0271188 A1 | 9/2015 | Call | |

(Continued)

*Primary Examiner* — Eleni A Shiferaw
*Assistant Examiner* — Cheng-Feng Huang
(74) *Attorney, Agent, or Firm* — Toler Law Group, PC (57) ABSTRACT

Systems, methods, and computer-readable storage devices to enable secured data access from a mobile device executing a native mobile application and a headless browser are disclosed. In a particular aspect, a mobile device includes a wireless transceiver, a processor, a display device, and a memory storing instructions executable by the processor to perform operations. The operations enable read and write access to secured data by the mobile device.

18 Claims, 6 Drawing Sheets

(56) References Cited

U.S. PATENT DOCUMENTS

| | | | |
|---|---|---|---|
| 2015/0379554 A1* | 12/2015 | Copeland | G06Q 30/0239 705/14.39 |
| 2017/0093828 A1* | 3/2017 | Lupien | H04L 43/0876 |
| 2017/0093839 A1* | 3/2017 | Whiteside | H04L 63/083 |

* cited by examiner

SECURED DATA ACCESS FROM A MOBILE DEVICE EXECUTING A NATIVE MOBILE APPLICATION AND A HEADLESS BROWSER

CROSS-REFERENCE TO RELATED APPLICATIONS

The present application claims the benefit of and priority from U.S. Provisional Patent Application No. 62/316,373 entitled "SECURED DATA ACCESS FROM A MOBILE DEVICE EXECUTING A NATIVE MOBILE APPLICATION AND A HEADLESS BROWSER," filed on Mar. 31, 2016, the entire contents of which are incorporated herein by reference.

BACKGROUND

As mobile devices become commonplace, users elect to perform more and more day-to-day tasks using mobile devices. For example, users may use mobile devices to work on projects that were typically reserved for desktop or laptop computers, such as editing documents and spreadsheets, creating drawings or graphic designs, generating multimedia content, etc. For a mobile device to perform certain tasks, the mobile device may need access to secured user data. However, due to security considerations and pre-existing back-end systems, providing mobile devices access to such secured user data may be challenging.

To illustrate, one day-to-day task in which mobile devices may be used is mobile banking. Increasingly, banking customers prefer to use a mobile device application to manage their money. As a result, banks are deploying mobile banking applications. For small and mid-size banks, it may be prohibitively expensive to develop a customized and full-featured mobile banking application (e.g., via in-house development or by hiring a third party development team), including setting up back-end security features and data integrations that enable such an application to communicate to access secured data, such as pre-existing account data, data stored in data warehouses, etc. To provide mobile banking for small and mid-size banks, some vendors use account aggregation, which involves storing user credentials for a bank on an intermediary server and then accessing the bank via the intermediary server. However, the account aggregation approach does not function properly if the bank blocks such accesses from third-party servers for security reasons. Storing user access credentials on intermediary servers (e.g., in the cloud) can also be a security risk. Moreover, the account aggregation approach may be limited to providing read-only account access rather than both read and write account access. As a result, the account aggregation approach may not offer features that involve modifying underlying bank accounts, such as mobile check deposit and fund transfers.

DETAILED DESCRIPTION

The present disclosure enables read and write access to secured data by a mobile device that executes a "native" mobile application (alternatively referred to herein as a "mobile app") and a "headless" browser. As used herein, a "native" mobile app is an application that is designed and coded for a specific device platform, such as for a specific mobile device operating system. Because native apps are created for a specific platform, native apps typically have the same "look and feel" as the underlying operating system and provide more reliable and faster performance than non-native apps. Native apps may also have access to device functionality that is unavailable to non-native apps. In addition, many mobile platform vendors offer storefronts from which users can download native apps. To encourage native app development, platform vendors often offer standardized software development kits (SDKs).

As used herein, a "headless browser" is an instance of a web browser that is executed by a device without display of a graphical user interface (GUI). Thus, while the headless browser may be used to send and receive web data (e.g., via hypertext transfer protocol (HTTP) GET commands, POST commands, etc.), the headless browser itself may not display such web data. Instead, as further described herein, a headless browser may serve as a web access mechanism for a native app on a mobile device.

In particular aspects, the systems and methods of the present disclosure may enable mobile devices to access secured data, such as bank account data, without requiring a provider of the data (e.g., a bank) to implement a technology integration between a mobile solutions provider (e.g., a developer or vendor of a mobile app) and an internet banking software/website provider. Such integrations, which may involve establishing security protocols, data encryption, standards-compliant application programming interfaces (APIs), and/or coordination between different vendors while maintaining compatibility with legacy banking systems, can be complex and expensive. Although various aspects are described herein in the context of banking and financial operations, such descriptions are for illustration only and are not to be considered limiting. The techniques of the present disclosure may additionally or alternatively be used to enable mobile device access to secured data other than banking/financial data, such as healthcare data, enterprise data, etc.

In accordance with the described techniques, a mobile device may utilize a native application and a headless mobile browser. In an illustrative non-limiting example, the native application may be a native mobile banking application that is installed (e.g., via download) on a mobile device, such as a smartphone or a tablet. The native application may be "brandable" for a given enterprise, such as a particular financial institution (e.g., bank, credit union, etc.). For a native mobile banking application, the native application may enable includes features such as account balance reporting, viewing transaction history per account, transferring funds between accounts, performing remote check deposits, paying bills, etc. In some examples, the native mobile banking application may have an API to enable integration with (and thereby enable access to) other software and functionality, such as software for peer-to-peer funds transfers, contact-less automated teller machine (ATM) authentication, loan applications, etc.

In some aspects, an API may link the native app to the headless browser to provide a consistent way of implementing customer-facing features and reading/writing data between the native app and servers (e.g., servers associated with a provider of the native app, third party servers, servers hosting an internet banking website, etc.). The native mobile app, the headless browser, and the API may create a personalized data integration, such as for a particular user's bank account, directly from the app.

In some aspects, user access credentials and other access data (such as personal identification numbers (PINs), multi-factor authentication codes, etc.) may be input into the native app and then passed to the headless browser by way of a "virtual API." The virtual API may include: (1) a common set of functions and data for user authentication or account information, which may be standardized across financial institutions; and (2) the specific website for the financial institution, including specific page layout, hypertext markup language (HTML), cascading style sheets (CSS), and/or JavaScript content that would typically be interpreted by a personal computer (e.g., non-mobile) browser and presented to a user as an internet banking website. The website may be accessed over a secured connection, such as a secure sockets layer (SSL) connection, and user interactions and data may be passed back and forth between the mobile device and the website (or a remote server hosting the website) is done via the secured connection. Thus, the headless browser on the mobile device may be used to emulate operations performed by a non-headless browser on a desktop or laptop computer or by a non-headless mobile browser directly accessing the website.

In some examples, the virtual API may be configured on a per-app basis so that mappings between banking features in the native app and their corresponding internet banking elements on the website may be established, such as via screen-scraping. Thus, the techniques of the present disclosure may enable a virtual API to be configured for each version of internet banking services/websites to reach a large population of bank users. Configuring virtual APIs in this manner may be simpler than building custom native apps and integrations for each financial institution, because there may only be a few dozen versions of internet banking services/website, whereas there are over 14,000 financial institutions in the United States alone. The systems and methods described herein may provide a technique for end-users to securely and efficiently access internet banking capabilities via a native mobile banking app while leveraging a secure real-time connection to internet banking rather than requiring access to a dedicated, expensive, or limited integration specific to the app. Moreover, the present disclosure may enable service providers, such as banks or credit unions, to deploy mobile banking applications without having to implement a dedicated back-end systems integration.

Figure 1:
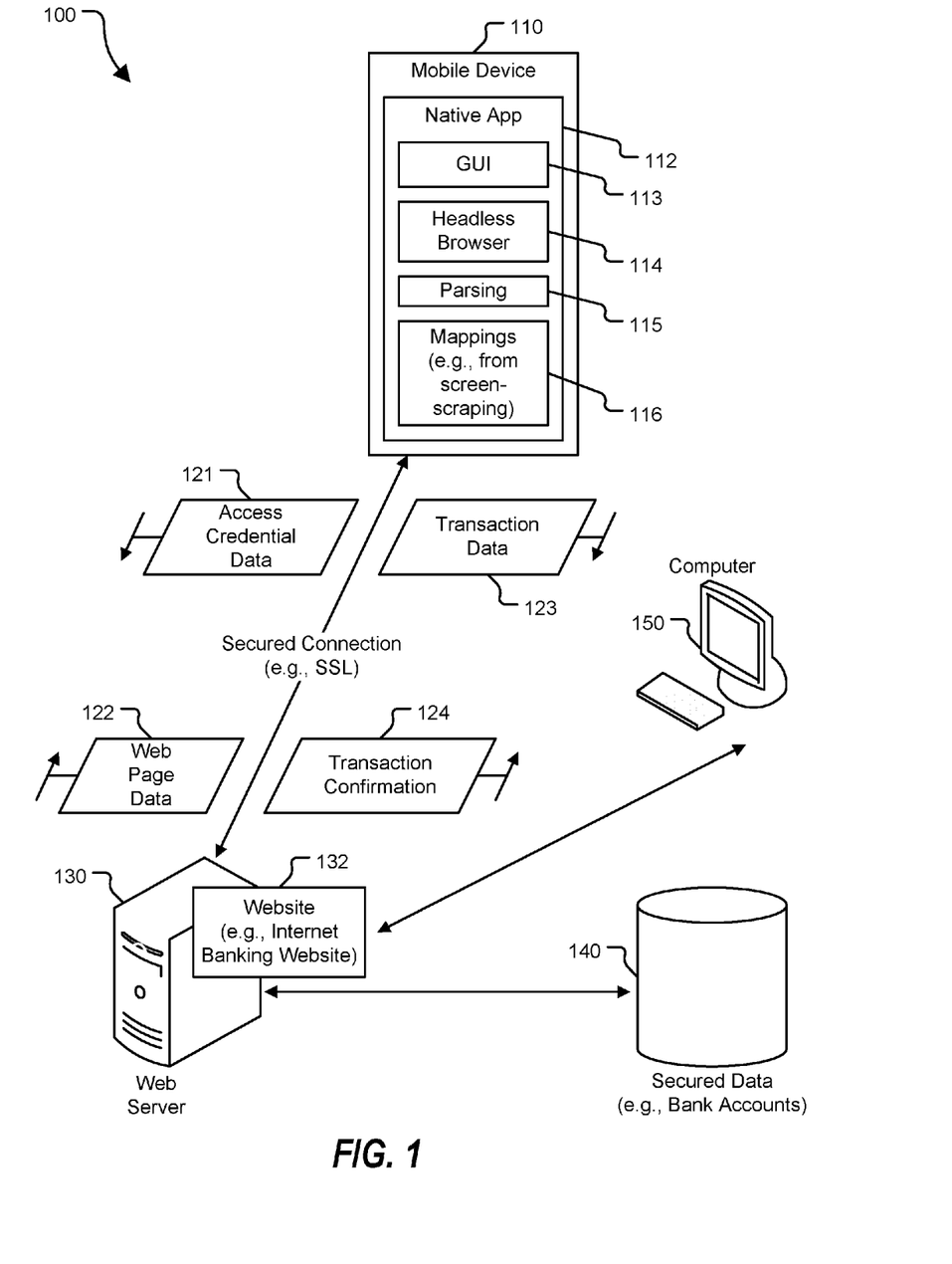
FIG. 1 is a diagram of an illustrative aspect of a system that supports secured data access from a mobile device executing a native mobile application and a headless browser.

Referring to FIG. 1, an illustrative aspect of a system is shown and generally designated 100. The system 100 includes a mobile device 110, such as a mobile phone, a tablet computer, a personal digital assistant, a wearable computing device, a portable media player, a computing device of a vehicle, etc. The mobile device 110 includes a memory that stores processor-executable instructions and data corresponding to one or more applications ("apps"). For example, the mobile device 110 may include a native app 112.

In some examples, as further described herein, the native app 112 may be a "branded" version of a mobile banking application that is specific to a financial institution, such as a specific bank or a specific credit union. In a particular aspect, a user of the mobile device 110 may download the native app 112 from an app storefront. In some examples, the native app 112 may be generated based on a generic native app template by adding branding components, such as names, logos, color schemes, typeface schemes, etc. For mobile banking, the native app 112 may be configured to perform banking operations such as an account balance operation, a fund transfer operation, a credit card payment operation, a deposit operation, a withdrawal operation, a bill pay operation, a transaction history operation, etc.

The system 100 also includes a web server 130 located remote to the mobile device 110. The web server 130 (which may correspond to multiple web servers in alternative examples) may be configured to host a website 132. In particular examples, the website 132 may be an internet banking website. In some aspects, the website 132 may be a "desktop" version of an internet banking website. To illustrate, the website 132 may deliver content that is formatted for presentation on a desktop or laptop computer, rather than a mobile version of such content that is formatted for presentation on a mobile device. Thus, in some aspects, the website 132 may typically be used by users at computers, such as an illustrative computer 150, to log in to their financial institution and perform internet banking functions. In other aspects, the website 132 may have content formatted for presentation on a mobile browser. The website 132 may enable a user of the computer 150 to access secured data 140, such as information regarding bank accounts. As another example, the website 132 may enable a user of the computer 150 to view account balances, transaction histories, and credit card information. As yet another example, the website 132 may enable a user of the computer 150 to transfer funds between accounts.

During operation, the mobile device 110 may use the website 132 to access the secured data 140, even if the website 132 includes content that is not formatted for mobile devices. To illustrate, the native app 112 may launch a headless browser 114 to enable communication with the website 132. The headless browser 114 does not include a GUI displayed to a user, although the native app 112 may have a GUI 113 displayed to a user.

In a particular aspect, the headless browser 114 may be combined with the native app 112 to form a single application package that can be downloaded and installed to the mobile device 110. Depending on platform, the headless browser 114 and the native app 112 may be combined or packaged using various methods. According to a first method, browser code may be included and compiled into the native app 112. According to a second method, the native app 112 may link to one or more libraries that enable web browsing, such as libraries offered by third parties or a mobile platform vendor (e.g., a mobile device operating system provider). According to a third method, the native app 112 may make API calls to an operating system of the mobile device 110 to access a dedicated instance of browser software "behind the scenes," where the dedicated instance is under the control of the native app 112.

In accordance with the techniques of the present disclosure, the native app 112 may utilize the headless browser 114 as a proxy. To illustrate, the native app 112 may use the headless browser 114 to emulate a request to login to the website 132 from a non-headless browser, such as a browser of a computer (e.g., the computer 150) in the case of a desktop internet banking website, or a browser of the mobile device 110 in the case of a mobile internet banking website.

To perform the login, the native app 112 may initiate a secured connection from the headless browser 114 to the website 132 and send access credential data 121 to the website 132. For example, the secured connection may be a secure sockets layer (SSL) connection and the native app 112 may send a username and password via SSL to the website 132 using the headless browser 114. To illustrate, the native app 112 may cause the headless browser 114 to request a login page of the website 132 and send the username and password to the website 132, such as by using HTTP GET/POST commands or other commands. In some examples, the access credential data 121 is received via a user input device of the mobile device 110, such as a touchscreen. Alternatively, the access credential data 121 may be retrieved from a memory of the mobile device 110.

The web server 130 may receive the access credential data 121 from the native app 112 for verification. To illustrate, the web server 130 may include software configured to compare the access credential data 121 to previously-stored access credential data. Alternatively, the web server 130 may forward the access credential data 121 to an authentication server. After the access credential data 121 is verified, the web server 130 may transmit web page data 122 to the headless browser 114. For example, the web page data 122 may correspond to the web page of the website 132 that would be sent to the computer 150 after a user of the computer 150 completed a login process of the website 132. Thus, the web page data 122 may include user-specific data, such as the user's name, the user's account number(s), account balance(s), and/or other information corresponding to one or more of the user's checking accounts, savings accounts, credit card accounts, money market accounts, loan accounts, investment accounts, etc.

The native app 112 may parse the web page data 122 to identify the user-specific data and may render such user-specific data for display on the GUI 113 of the native app 112. To illustrate, the native app 112 may include a parsing module 115 configured to parse the web page data 122. In some examples, the native app 112 may access mappings 116 between various web pages and features of the website 132 and corresponding GUI elements (e.g., fields, buttons, screens, etc.) of the native app 112. To illustrate, such mappings 116 may be determined using a screen-scraping operation. Thus, different versions of the native app 112 may be deployed for different financial institutions, different internet banking websites or services, etc.

It will be appreciated that by emulating a computer login to the website 132 and displaying user-specific information in the GUI 113, the native app 112 (using the headless browser 114) may enable read access to the secured data 140 by a user of the mobile device 110. The techniques of the present disclosure are not limited to read-only access. For example, during operation of the native app 112, the native app 112 may receive a user command, such as a command to transfer funds between two accounts, as an illustrative non-limiting example. In response, the headless browser 114 may send transaction data 123 to the website 132 via a secured connection, where the transaction data 123 indicates a modification to be made to the secured data 140. For example, the transaction data 123 may correspond to HTTP command(s) that would be issued by the computer 150 when requesting a funds transfer operation on the website 132.

Thus, from the perspective of the website 132, there is no difference between transaction data originating from a computer and the transaction data 123 sent by the headless browser 114 at the mobile device 110. Upon receiving the transaction data 123, the web server 130 may take action to modify the secured data 140 (e.g., may initiate the funds transfer operation). After the modification to the secured data 140 is performed, the website 132 may transmit a transaction confirmation 124 to the mobile device 110 to confirm the modification to the secured data 140 (e.g., completion of the funds transfer operation), and the transaction confirmation may optionally be displayed in the GUI 113 of the native app 112. The new balances of the user's accounts may also be displayed in the GUI 113 the next time the native app 112 performs a read operation on the secured data 140.

In some examples, the native app 112 may enable access to additional software and functionality that is not typically available via the internet banking website 132. For example, the native app 112 may include separate capabilities or integrations to interact with other software and the underlying hardware of the mobile device 110, or with third party service(s) or device(s) via hardware/software interfaces on the mobile device 110. To illustrate, the native app 112 may have an integration with an automated teller machine (ATM) software provider or network and may utilize a short-range wireless transceiver of the mobile device 110 to perform contactless authentication with an ATM.

As another example, the native app 112 may access the internet via a secure network connection and may interact with an external service, such as a peer-to-peer fund transfer service, directly rather than relying on an API to communicate with the internet banking website 132. To illustrate, consider two users that have native apps on their mobile devices, where the native apps operate in accordance with the present disclosure. The native apps may be for the same financial institution or may be for (and thus including branding associated with) different financial institutions. Each user may interact with the native app on their mobile device, where the native app is integrated with a third party peer-to-peer fund transfer service (although the peer-to-peer fund transfer service does not have an integration with the bank(s)). The native apps may have access to each user's account information, such as clearinghouse/routing and/or debit/credit card information. For example, such information may previously have been provided by the users or may have been determined from using a headless browser to interact with the banking websites of the bank(s). This information and the native apps may be used to facilitate transfer of money by way of the third party peer-to-peer service. In some aspects, having the two mobile devices in close proximity may be used for a secure and local discovery option in lieu of requiring entry of account information. To illustrate, for mobile devices in close proximity that are executing their respective native mobile banking apps, authentication may be automatic. If the mobile devices are not executing the apps, the apps may nonetheless "discover" each other via a device feature or service, global positioning system (GPS), short-range wireless networking, application-level handshaking, etc. To illustrate, the native app may request the mobile device to "show all users that are have compatible mobile banking apps in discovery mode, have registered with a third party server in the last thirty seconds, and have GPS coordinates within one meter of me").

The system 100 of FIG. 1 may thus enable read and write access to the secured data 140 by the native app 112 without requiring a dedicated back-end integration between the native app 112 and legacy banking systems. By implementing internet banking features or capabilities as mobile app features, the architecture shown in FIG. 1 may enable banks to more quickly roll out mobile banking functionality. The architecture shown in FIG. 1 may also have several downstream benefits. Such benefits may include, but are not limited to one or more of: (1) inability for a vendor to block accesses by the native app 112; (2) improved security as compared to systems that store the access credential data 121 in the network; (3) improved performance and/or user experience by virtue of utilizing the native app 112 rather than a web app, hybrid app, or conventional web pages access (e.g., as would be performed by the computer 150); (4) ability to save time by deploying the native app 112 without interaction with a provider of the website 132 or requesting the provider to customize access for the bank; or (5) ability to integrate third party services, such as loan decisioning software or merchant rewards programs directly in the native app 112 (bypassing the need for these providers to integrate with core or internet banking providers).

Figure 2:
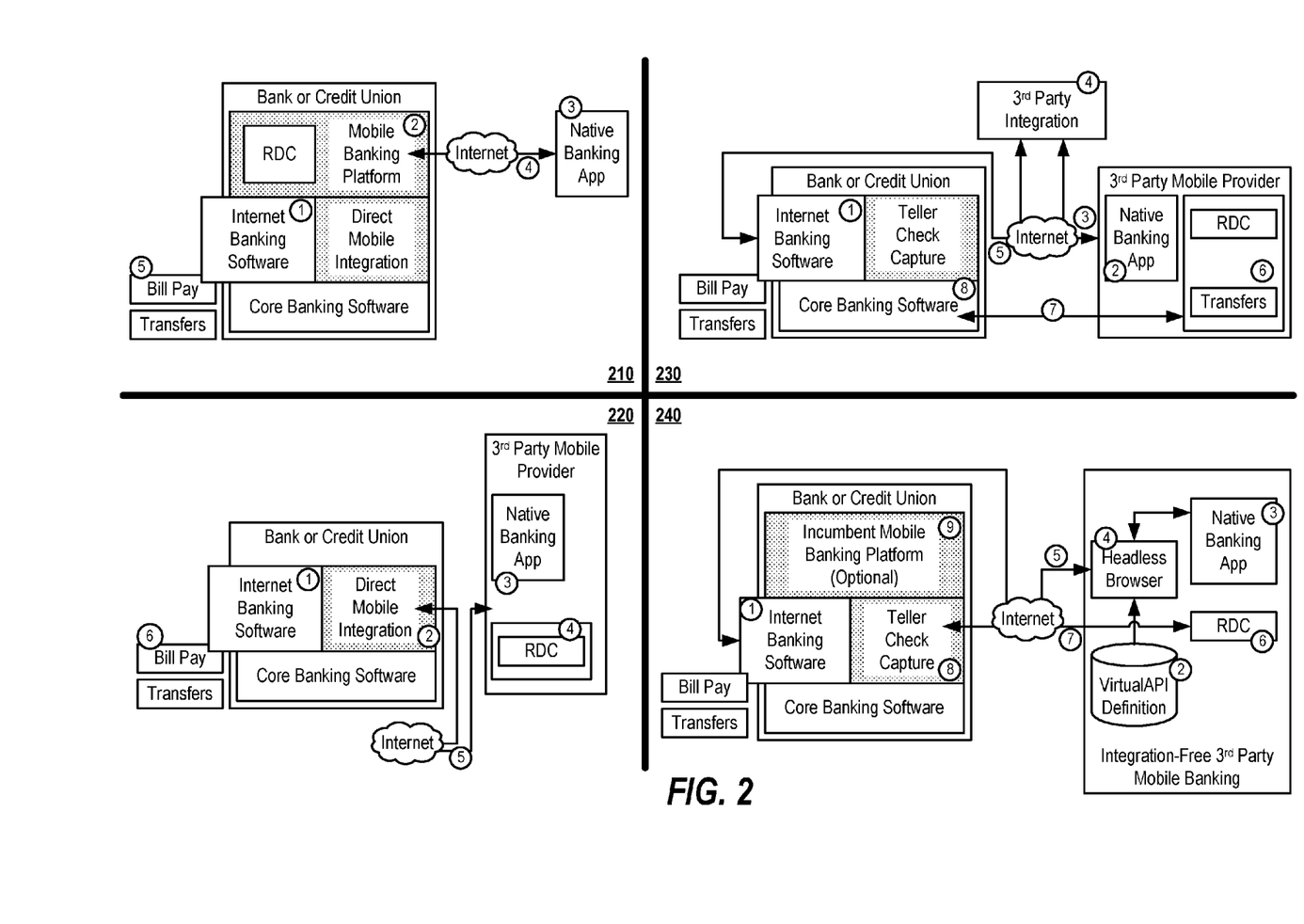
FIG. 2 is a diagram to illustrate aspects of methods of enabling mobile device access to secured data.

The system 100 of FIG. 1 may also provide additional benefits compared to other approaches. For example, FIG. 2 illustrates four mobile banking approaches 210, 220, 230, and 240, where the fourth approach 240 corresponds to the system 100 of FIG. 1.

The first approach 210 corresponds to custom developed native banking apps or apps offered by incumbent internet banking providers. Referring to element 1 of the first approach 210, the bank or credit union may have existing internet banking software. A customer's access credentials (username/password) and multi-factor authentication may be set up as part of internet banking. It may be standard practice (e.g., in the banking industry) for the access credentials for internet banking to be the same credentials that a user would use for mobile banking, and internet banking (and an associated user account) may be prerequisites for using mobile banking apps. The internet banking software may be configured to integrate with the bank or credit union's "core" banking software, which may handle basic accounting and money-movement functions.

Referring to element 2 of the first approach 210, the bank or credit union may deploy a mobile banking platform with integrated remote deposit capture (RDC) capabilities. This mobile banking platform may be an add-on product that is directly integrated with the bank's existing internet banking software. In most cases, the mobile banking platform may be a product of the same company that supplies the bank or credit union's internet banking software. The mobile banking platform may read and write data to the internet banking software and may provide necessary data (such as account balances, transaction history, etc.) to the native banking app. If users of the native banking app want to make modifications to their accounts (such as transfers, deposits, paying bills, etc.), it is the mobile banking platform that handles these requests and makes the required function calls to internet banking. The mobile banking platform may provide mobile-specific extensions to the internet banking software. These extensions may typically include handling for RDC, but can also include other mobile-specific capabilities that require interaction with bank data or back-end systems.

Referring to element 3 of the first approach 210, the mobile banking platform vendor may provide a native banking application, either branded for the bank or credit union, or configured to access the bank or credit union's systems. This native banking application may be distributed through various mobile platform app stores. The mobile banking application may be "hard-coded" to a specific bank or credit union and may be directly integrated into the mobile banking platform. Referring to element 4 of the first approach 210, the native banking application may directly access the mobile banking platform over a secure network connection and may interact with the mobile banking platform through a private and secure API. Users may enter their internet banking login credentials and/or multi-factor information into the native banking app, and this information may be passed over the secure network connection. The API and protocol may not be open for third parties to develop against, meaning that if a bank or credit union wants to use the mobile banking platform capabilities offered by their internet banking provider, they are limited to using only the native banking application provided (and any per-user costs that come with doing so).

Referring to element 5 of the first approach 210, the internet banking software may provide alternate methods for bill pay and fund transfers for web-based users. In many cases, the mobile banking platform may only offer a subset of the capabilities of internet banking software to native mobile banking app users.

The second approach 220 corresponds to the use of third party mobile platforms to deliver mobile banking. The internet banking software shown at element 1 of the second approach 220 may operate similarly to the internet banking software shown at element 1 of the first approach 210. Referring to element 2 of the second approach 220, some internet banking software providers may provide direct mobile integration capabilities for use by third parties or by the bank or credit union if they elect to develop their own native mobile banking app. This integration interface may often be "tolled" or licensed separately to the internet banking software, making the adoption of third party mobile applications or in-house developed applications expensive for the bank or credit union. Where such direct mobile integrations are available, they may enable mobile banking applications to interact with internet banking software via a secure and proprietary API. However, such integrations may not provide access to all of the features that are available in internet banking or may not provide integrations for mobile-only capabilities (e.g., RDC), which may require the bank or credit union to adopt additional services (or implement such integration themselves) to provide access to such features.

Referring to element 3 of the second approach 220, the bank or credit union can develop their own native banking application or adopt a third party application that is compatible with their internet banking software. The native banking application may be distributed through various mobile platform app stores. The mobile banking application may be hard-coded to a specific bank or credit union and may be linked to the internet banking software used by that financial institution.

Referring to element 4 of the second approach 220, mobile-specific features like RDC may be integrated into the native mobile banking app and may be dependent on third party service adoption by the bank or credit union for processing or integration. This may add cost and complexity for adoption if the mobile-specific services are not directly supported by the direct mobile integration for a given internet banking software platform. Referring to element 5 of the second approach 220, the native banking application may access internet banking for a bank or credit union by interfacing with the direct mobile integration over a secure network connection, and through a proprietary and secure API. Users may enter their internet banking login credentials and/or multi-factor information into the native banking app, and this information may be passed over the secure network connection. Unlike the first approach 210, in the second approach 220 the API and protocol may be open for third parties to develop against. However, access to the API may be controlled by the internet banking software provider, which may result in both business and technical restrictions that reduce the attractiveness of third party solutions.

Referring to element 6, the internet banking software may provide alternate methods for bill pay and fund transfers for web-based users. In most cases, the mobile banking platform may only offer a subset of the capabilities of internet banking software to native mobile banking app users.

The third approach 230 corresponds to "integration free" apps that rely on third party mobile platforms. Referring to element 1 of the third approach 230, Customer access credentials (username/password) and multi-factor authentication may be set up as part of internet banking. It may be standard practice (e.g., in the banking industry) for the access credentials for internet banking to be the same credentials that a user would use for mobile banking, and internet banking (and an associated user account) may be prerequisites for using mobile banking apps. The internet banking software may contain functionality to secure user accounts by limiting access to the internet banking website to validated users. Because bank accounts may be high-value targets for hackers, banks and credit unions often configure their internet banking software to limit access to only certain client browsers, identified by cookies or other means, which have previously accessed the system after successfully passing extra security challenges such as multi-factor authentication. For example, a browser that had previously passed multi-factor authentication would be identified, and a username/password may be considered sufficient for future access from that browser. The internet banking software may also be configured to integrate with the bank or credit union's "core" banking software, which may handle basic accounting and money-movement functions.

Referring to element 2 of the third approach 230, the bank or credit union may engage a third party vendor for native banking applications or end-users to use native banking applications that are designed to access multiple banking, utility and credit card accounts. Applications of this type may not directly interact with a bank or credit union's internet banking software, and may instead rely on account aggregation services for access to account information, such as available balances, transaction history, etc. These native banking applications may be distributed through various mobile platform app stores, either as branded applications for the bank or credit union or under some other consumer brand for financial management services.

If the mobile banking application is branded for a specific bank or credit union, it is hard-coded to that institution. However, unlike other scenarios, this link may be indirect. Instead of referencing the financial institution's internet banking uniform resource locator (URL) or other web service address linked to the bank or credit union's back-end systems, these mobile banking apps may reference an institution identifier (ID) that uniquely identifies the bank or credit union with one or more account aggregation services. Bank username/password credentials may be passed along with this institution ID and may enable these native banking applications to access aggregated user financial information from third party services.

Referring to element 3 of the third approach 230, the native banking application may utilize a proprietary API for a given account aggregator. The native banking application may use a secure network connection to transmit application/developer credentials along with the institution ID and (e.g., on first login) the username and password for internet banking for a given bank or credit union's customer. On subsequent logins, the application may pass a user token or other unique identifier that acts as a secure alternative to the user's username and password, so that the native mobile application does not have to store the user's access credentials. Instead, those credentials may be stored with the account aggregation service (e.g., in the cloud). On first login, the secure connection may also be used to pass multi-factor authentication challenge(s) and responses between the account aggregator and the native banking application. These multi-factor authentication challenges may be triggered by the account aggregator initiating a new web session request with the bank or credit union's internet banking system on behalf of the native banking application user. User responses to multi-factor authentication challenges are passed back over this secure channel to the account aggregator and, if valid, may be stored for future use. Other than passing login credentials and multi-factor authentication challenge information indirectly to internet banking, secure network traffic using this API is read-only.

Referring to element 4 of the third approach 230, the account aggregator may provide services to developers who have authorization from end-users. These users may elect to use native banking apps to access their banking, credit card, or other account information. The account aggregators may maintain internet services that operate virtual browsers that use stored authentication credentials for users to log into internet banking software on their behalf. The virtual browsers may view and capture account information for a user's account, either on a periodic schedule (e.g., daily/hourly), or on-demand (e.g., in real-time or near-real-time) when a user accesses a native banking application that is enabled by these services.

The account aggregator may store personal financial data in a database and may make the personal financial data available for display or download to the native banking application via secure network connection. Because these services are coming from a third party, and because the servers that host these virtual browser sessions may handle requests for many thousands of simultaneous users across many thousands of banks and credit unions, the account aggregator system illustrated in the third approach 230 tends to have a single point of failure. Because the bank or credit union may not be directly aware that a user is relying on these third party services for any particular session, the bank or credit union (or the internet banking software provider that is providing the software/infrastructure that is being accessed) may block the account aggregator services from accessing internet banking. This can affect one bank or credit union, or, if the block is done by a major internet banking software provider, it can affect thousands of financial institutions. As a result, banks or credit unions that use third party mobile banking service providers leveraging account aggregation technology often require that the third party mobile banking providers have multiple, redundant account aggregation connections to maintain high levels of service availability, which may increase cost and complexity.

Referring to element 5 of the third approach 230, a secure (e.g., SSL) web connection between the account aggregator's virtual web browsers and the internet banking software for a bank or credit union may be established. This connection may be made every time that the account aggregator updates user data. The user authentication data needed for logging in to internet banking may be passed each time, and may therefore be stored by the account aggregator (e.g., at a network server). A downside of this approach is that many of these virtual browser connections may come from the same internet protocol (IP) address and may thus trigger false positive security warnings with the internet banking software provider.

Referring to element 6 of the third approach 230, because the third approach does not directly interact with internet banking, services that "write" data to a user's account at the financial institution, such as RDC and transfers may require a separate back-end integration with the core banking software for the financial institution. There are some standards-based methods for handling transfers and remote deposits/check images. By bypassing the need to integrate with internet banking software, banks and credit unions may be able to avoid fees associated with mobile banking or dedicated mobile banking interfaces. However, such benefits may be offset by the added complexity of integrating directly with core banking software, and, in the case of RDC, the need to use processes for check verification that are often different than an existing teller check capture system in place at the bank or credit union.

Element 6 of the third approach 230 also addresses the ability of native banking applications powered by account aggregation to work around the lack of integration with key services. One area where this approach is unable to offer feature-parity with other systems is with bill payment services, which are typically available in internet banking software. The native mobile banking applications of the third approach 230 may not be able to interact with internet banking bill pay systems, requiring the bank or credit union to either not offer the feature or to offer a parallel and dedicated mobile banking bill payment system that integrates with the native mobile banking application but relies on third party automated clearing house (ACH) settlement or custom core integration for money movement. Such mobile-only solutions may introduce significant user experience challenges, with the potential for double-payment of bills.

Referring to element 7 of the third approach 230, transaction data may be written to a file and transferred over a secure connection (such as secure file transfer protocol (SFTP)) from servers run by the third party native mobile banking provider to the bank or credit union's back-end systems. From there, the transactions may be "posted" to the core banking software using various integration techniques that may vary by vendor.

Referring to element 8 of the third approach 230, most core banking software systems may not be real-time. As a result, mobile transactions, such as transfers, deposits, etc., may need to be "synced" with the core banking software. Until they are synced, these "write" transactions do not show up in internet banking (e.g., are not visible when a user checks their account balances), and must accounted for separately in the native mobile banking app. This secondary integration requirement and disconnect from internet banking can result in cases where information displayed in the native mobile banking application does not accurately reflect the user's actual account status.

The fourth approach 240 corresponds to integration-free third party mobile banking in accordance with the present disclosure. Referring to element 1 of the fourth approach 240, the bank or credit union may have existing internet banking software available for their customers. The customer's access credentials (e.g., username/password) and/or multi-factor authentication may be set up as part of internet banking. It may be standard practice in the industry for the access credentials for internet banking to be the same credentials that a user would use for mobile banking, and internet banking and an associated user account may be prerequisites for using mobile banking apps. The internet banking software may be configured to communicate with the bank or credit union's core banking software, which may handle basic accounting and money-movement functions.

Referring to element 2 of the fourth approach 240, the systems and methods of the present disclosure may create a "fingerprint" of the internet banking service pathways used for a user to log in, authenticate, and take other actions possible with internet banking. This unique service fingerprint may be stored at a server and may be loaded (e.g., at runtime) into the native mobile banking app as a virtual API component that configures headless browser interaction with the native mobile banking app. This fingerprint may also enable identification of changes that occur to the internet banking software. These changes may trigger automated validation processes that verify that user accounts can (continue to) be accessed correctly. In the event that there is a change detected in the virtual API fingerprint for a given bank or credit union, a process may be triggered to update the fingerprint to incorporate changes so that normal operations can be restored. For each bank or credit union, there may be a unique fingerprint ID to configure how the virtual API interacts between the headless browser and the internet banking software. It may be possible for the virtual API system to load more than one fingerprint per application, theoretically enabling the native mobile banking application to directly access internet banking software for more than one bank or credit union on behalf of a user that has valid credentials at multiple institutions. This also enables the native mobile banking application to be independently branded and enables consumers to access any fingerprinted internet banking system. If configured in this manner, users may select their financial institution from among multiple fingerprinted organizations prior to initial login.

In some aspects, the native app uses the headless browser to send and receive information to and from the internet banking system through an established interface. Once a system for a bank or credit union is fingerprinted for use by a virtual API, the native app may provide access credential data, such as username, password, and any additional information needed to authenticate (e.g., multi-factor authentication code, etc.). The need to pass in additional authentication information would be determined by the headless browser parsing the initial response to the application passing in the username/password. If the website responds in a way that was previously fingerprinted as being associated with a multi-factor authentication request, the native app may prompt the user to enter such information, which may be obtained via an out-of-band channel, such as e-mail or text message. Similarly, if the website responds to an authentication attempt with a multi-factor authentication challenge, a fingerprint may indicate how to respond to such a challenge, and the native app may parse the challenge so that the challenge can be relayed to the user in the GUI of the native app via the virtual API. The resulting response from the user would then be passed back through the virtual API into the headless browser and then relayed from the headless browser to the server/web server hosting the internet banking website.

Alternatively, the server/web server may reject/fail the authentication and provide an error status/page. In this scenario, the error/status page may have been pre-mapped and fingerprinted. The error status would be parsed and passed back to the native app by the virtual API for display to the user, so that the user can take action (e.g., by re-entering the correct information, etc.). The virtual API may thus function as a mapping of all potential interactions and responses between the website/web server/internet banking pages and the actions that the user can take in the native mobile banking application.

In some examples, additional data acquisition functions may take place with the virtual API and the headless browser that are not related to direct actions taken by the user. For example, once the user has authenticated, the native app, in the background, may make a series of virtual API requests through the headless browser that have the effect of triggering the internet banking server to display recent banking transactions. The native app can parse and store that information for future use, and this process can be done asynchronously from any user interaction with the native app. This same capability can be used to retrieve other account and transaction related information (e.g., transaction details, scanned check/deposit images, etc.), and can also be used to provide enhanced responsiveness to the user for account related activities. For example, in the GUI of the native app, the user may perform a transfer action which may take the internet banking server ten seconds to complete. The native app may perform other functions while the headless browser interacts with the internet banking server (e.g., website) and waits for a response that the transfer was finalized. In this example, if the transfer completes, the user may receive a confirmation notice in the GUI of the native app, or may not be notified (under the assumption that the transfer went through if there is no notification), thereby saving the user ten seconds and enabling the user to move on to another function. If the headless browser decodes a response that has been fingerprinted and is mapped by the virtual API to a failure or exception, this can trigger a notification to the user or enable the user to be taken back to the point in the native app where the user can attempt to correct the failure or exception.

Referring to element 3 of the fourth approach 240, the native mobile banking application may be branded for a specific bank or credit union and may be distributed in the app stores associated with various mobile platforms. These native mobile banking applications may be configured to offer users mobile-formatted user interfaces for accessing banking features. Features supported by internet banking and fingerprinted by the virtual API can be configured in the native mobile banking application. Additional mobile-only features, such as RDC or mobile wallet card enrollment, can be directly supported.

Referring to element 4 of the fourth approach 240, the headless browser may act as an integration layer that presents a unique, distributed, secure web browsing session in real-time or near-real-time to the internet banking system identified by the virtual API fingerprint. In contrast with the other approaches 210, 220, 230, access by the headless browser associated with the use of the native mobile banking application directly relates to authorized user activity on behalf of the financial institution and is identical in terms of access traffic to a mobile browser login originating from the same device. This has substantial security, performance, integration, operational and business benefits. By leveraging headless browser technology, the fourth approach 240 enables direct interaction in real-time or near-real-time for both "read" and "write" activity for a user's accounts without requiring a direct mobile integration interface (e.g., the direct mobile integration interface used in the first approach 210 or in the second approach 220). Multi-factor authentication challenges may be facilitated by session and cookie-handling of the headless browser, leveraging security protocols for internet banking that are already in place.

Referring to element 5 of the fourth approach 240, a standards-compliant SSL-encrypted web network connection may enable the native mobile banking application to interact as securely as any SSL-protected mobile web connection to a bank or credit union's internet banking system. Traffic between the internet banking software is encrypted and can only be decrypted by the headless browser session. Data and interactions from the native mobile banking application are packaged by the virtual API and passed back via the headless browser over this SSL-encrypted web network connection in a format defined by the fingerprint for the internet banking service.

Referring to element 6 of the fourth approach 240, internet banking software is web-based software, and, as such, may not have support for RDC (which requires access to a high-quality digital camera capture device, such as those on smartphones). RDC is a popular mobile banking feature, so in the fourth approach 240, RDC is natively supported in mobile banking application. Instead of requiring the bank or credit union to adopt dedicated RDC software for reviewing scanned check deposits, the fourth approach 240 may include direct integration with the teller check capture method that the bank or credit union uses for scanning check deposits at brick-and-mortar branch locations or ATMs. By tying into the existing high-volume check scanning system, the fourth approach may eliminate additional cost and complexity for the bank or credit union. The user interface for RDC, which may be branded for each financial institution, may be independent of the teller check capture system. In the fourth approach 240, RDC may involve providing image and transaction data to the teller check capture system in the format expected by the teller check capture system.

Referring to element 7 of the fourth approach 240, the encrypted secure network connection may use a vendor-specific teller check capture API interface that the bank or credit union would use when submitting checks for review and processing from remote branches or ATMs. This process may be secured by access credentials and API access keys specific for that bank or credit union. Referring to element 8 of the fourth approach 240, the teller check capture back-end software may be used by banks or credit unions that allows for automated processing of paper checks. The checks are converted to Check 21 compliant digital documents for review and processing. Check 21 compliant checks are compliant with United States federal law embodied in the Check 21 Act, also known as the Check Clearing for the 21$^{st}$ Century Act, enacted in 2003. Check 21 compliant systems may apply business rules to automate the acceptance or rejection of items based on identified document characteristics (such as valid amount or signature), or account-specific variables (such as overdraft history, risk scoring or available balance). The teller check capture systems may also integrate with core banking software.

Referring to element 8 of the fourth approach 240, in some examples, an optional incumbent mobile banking platform may be present. Banks and credit unions may have existing mobile banking applications available for use by their customers. These applications may be of limited function, outdated, expensive, or otherwise limited. The fourth approach 240 may enable financial institutions to easily switch to native mobile banking apps, because the native mobile app of the present disclosure does not interact with the existing mobile banking platform. Banks or credit unions may opt to keep the existing mobile banking platform in place to service legacy users, or to meet contractual obligations to incumbent vendors, while using the technology of the present disclosure for other end users.

Thus, for a financial institution that has not yet deployed mobile banking software, the fourth approach 240 may be more secure, faster to implement, and more full-featured than any of the approaches 210-230. The above described advantages of the fourth approach 240 may incentivize financial institutions that have already deployed mobile banking software according to one of the approaches 210-230 to instead switch to the fourth approach 240.

It should be noted that unlike other systems which may utilize a headless browser, the techniques of the present disclosure do not execute the user interface in the headless browser and then translate a resulting experience to a client. Rather, the "client" native mobile app may have a fixed user interface that does not vary in presentation based on a server-side website. Instead, the client user interface may be defined at the point the native app is published to an app store. Moreover, in the techniques of the present disclosure, the headless browser is used to create a secure, standards-based browser session with internet banking, which can be considered an application-specific proxy server. Before the native app is published, a virtual API configuration is created for a bank or credit union, and the virtual API configuration defines the internet banking functions available and the expected methods in HTML/JavaScript for reading/writing that information to the internet banking site. This configuration may be different for different banks/credit unions and may correspond to items, such as username or password, transaction information, etc. Each such item may be pre-mapped in the configuration against the banking application API, which may be standardized across all branded "versions" of the native app. Thus, in some aspects, a particular native app may only be compatible for use on a specific website and/or a specific version of internet banking software. In the systems and methods of the present disclosure, the headless browser does not rely on translation between the website's interface and the banking app. Instead, the headless browser may be used as a secure pipe over an open network interface.

Figure 3:
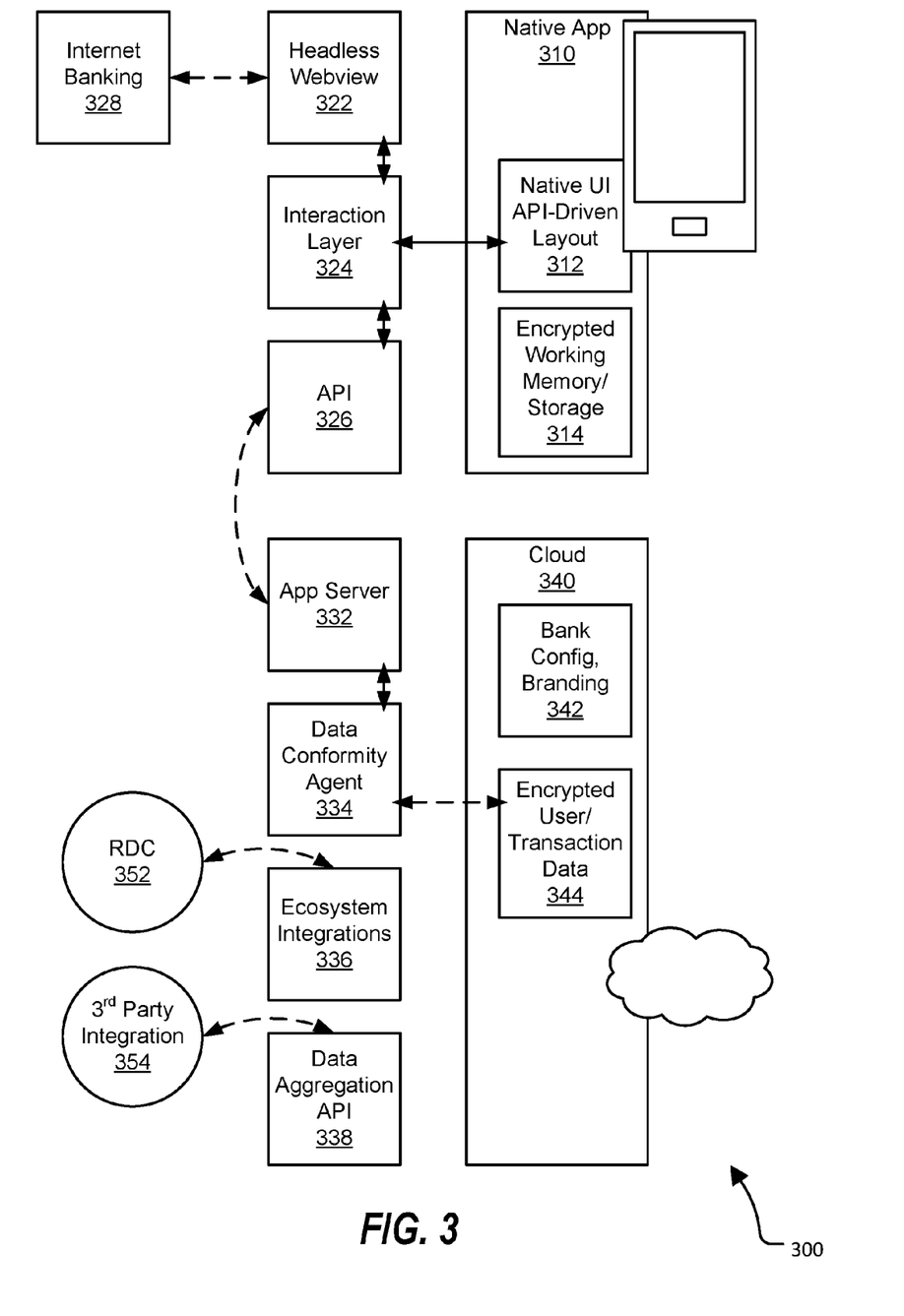
FIG. 3 is a diagram to illustrate another aspect of a system that supports secured data access from a mobile device executing a native mobile application and a headless browser.

Referring to FIG. 3, another illustrative aspect of a system 300 is shown. In particular, the system 300 corresponds to a high-level architectural diagram to illustrate technology that may be used to facilitate read and write access by a mobile device to secured data.

The system 300 includes a native app 310, which may function as described with reference to the native app 112 of FIG. 1 and the native banking app shown at element 3 of the fourth approach 240 of FIG. 4. The native app 310 may include a native user interface having an API-driven layout 312 and an encrypted working memory/storage 314.

The system 300 also includes a cloud component 340, which may correspond to one or more cloud servers. The cloud component 340 includes bank configuration and branding data 342 and encrypted user/transaction data 344.

To facilitate communication between the native app 310 and internet banking 328 (e.g., a bank website), the native app 310 may utilize an interaction layer 324 to communicate with a headless webview 322 (e.g., the headless browser 114 of FIG. 1 or the headless browser shown at element 4 of the fourth approach 240 of FIG. 2).

The native app 310 may also communicate with an application server 332 via an API 326. In a particular aspect, the API 326 corresponds to the virtual API described with reference to FIGS. 1-2. The cloud component 340 may also communicate with a data conformity agent 334, as shown. RDC 352 and third party integration 354 may be accessible via ecosystem integrations 336 and a data aggregation API 338, respectively. For example, the application server 332, the data conformity agent, the integrations 336, and the data aggregation API 338 may enable functions that are not typically available via internet banking, such as contactless ATM authentication, peer-to-peer fund transfer, etc., as described with reference to FIGS. 1-2.

Figure 4:
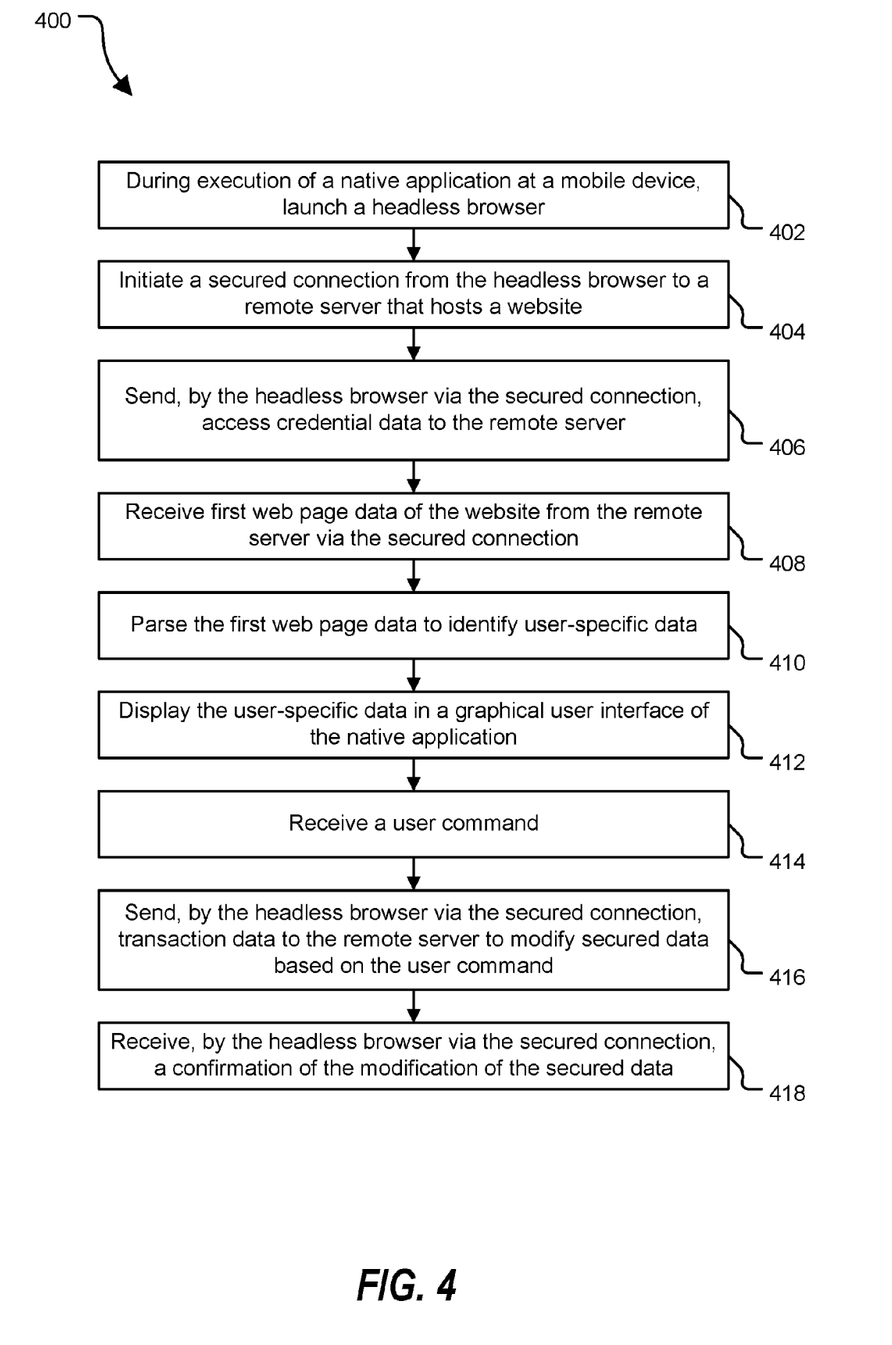
FIG. 4 is a flowchart to illustrate a method of operation at a mobile device.

Referring to FIG. 4, an illustrative aspect of a method 400 of operation at a mobile device is shown. In particular examples, the method 400 may be performed by the mobile device 110 of FIG. 1, a mobile device implementing the integration-free third party mobile banking solution described with reference to the fourth approach 240 of FIG. 2, or a mobile device executing the native app 310 of FIG. 3.

The method 400 includes, during execution of a native app at a mobile device, launching a headless browser, at 402. The method 400 also includes initiating a secured connection from the headless browser to a remote server that hosts a website, at 404. The method 400 further includes sending, by the headless browser via the secured connection, access credential data to the remote server, at 406. Continuing to 408, the method 400 includes receiving first web page data of the website from the remote server via the secured connection. The method 400 includes parsing the first web page data to identify user-specific data, at 410, and displaying the user-specific data in a GUI of the native app, at 412. The method further includes receiving a user command, at 414, and sending, by the headless browser via the secured connection, transaction data to the remote server to modify secured data based on the user command, at 416. The method includes receiving, by the headless browser via the secured connection, a confirmation of the modification of the secured data, at 418. The method 400 may thus enable a native app on a mobile device to access secured data using a headless browser, which may provide faster performance and/or an improved user experience as compared to a non-native app or requiring the user to open a mobile browser to manually access a website.

Figure 5:
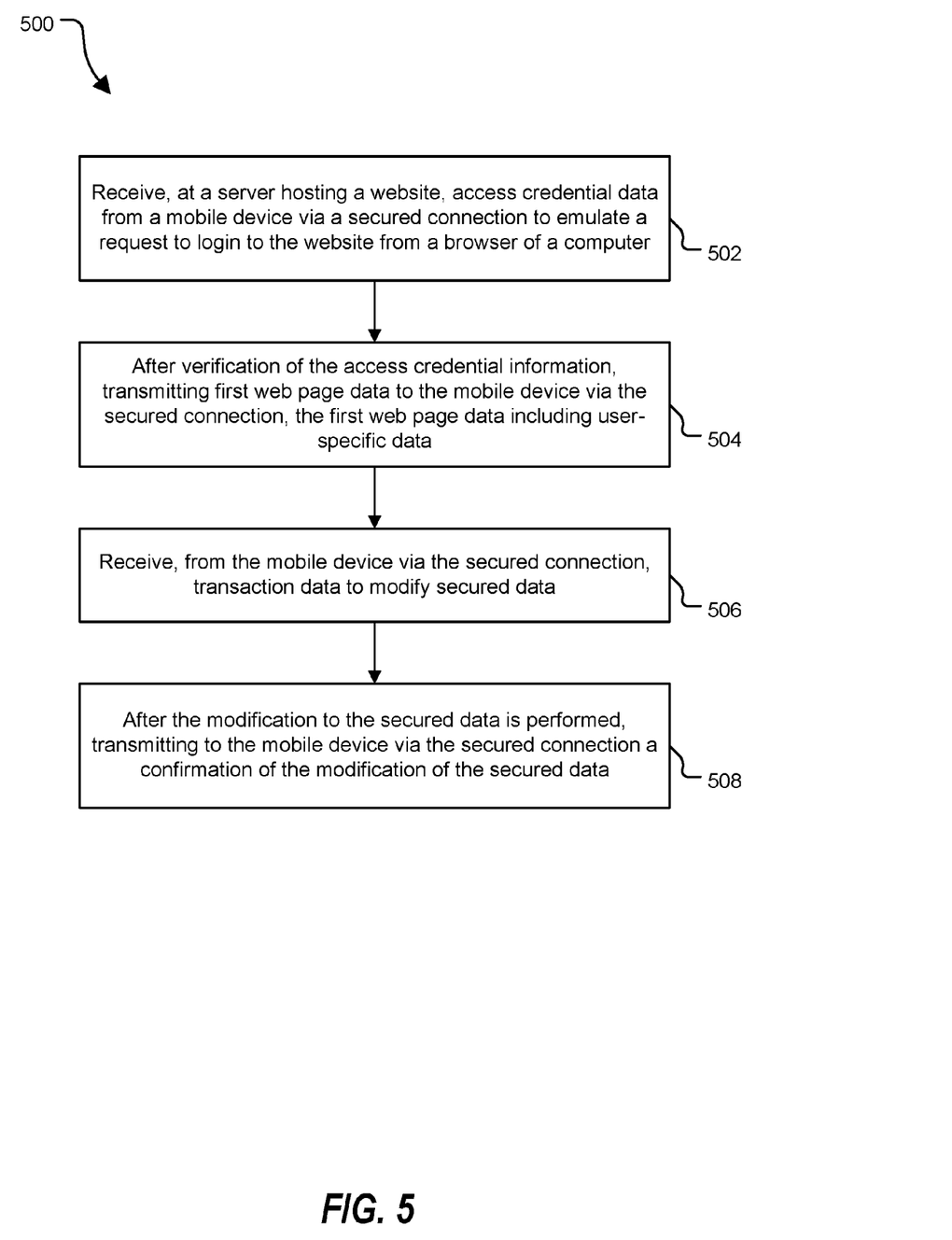
FIG. 5 is a flowchart to illustrate a method of operation at a server.

Referring to FIG. 5, an illustrative aspect of a method 500 of operation at a server is shown. In particular examples, the method 500 may be performed by the web server 130 of FIG. 1, a server hosting the internet banking software shown at element 1 of the fourth approach 240 of FIG. 2, or a server hosting the internet banking 328 of FIG. 3.

The method 500 includes receiving, at a server hosting a website, access credential data from a mobile device via a secured connection to emulate a request to login to the website from a browser of a computer, at 502. The method 500 also includes, after verification of the access credential information, transmitting first web page data to the mobile device via the secured connection, the first web page data including user-specific data, at 504. The method 500 further includes receiving, from the mobile device via the secured connection, transaction data to modify secured data, at 506. The method 500 includes, after the modification to the secured data is performed, transmitting to the mobile device via the secured connection a confirmation of the modification of the secured data, at 508.

It is to be understood that in alternative aspects, one or more steps of the methods 400, 500 of FIGS. 4-5 may be performed in a different order, may be combined or performed at least partially concurrently, or may be omitted. Further, one or more other steps may be added.

Figure 6:
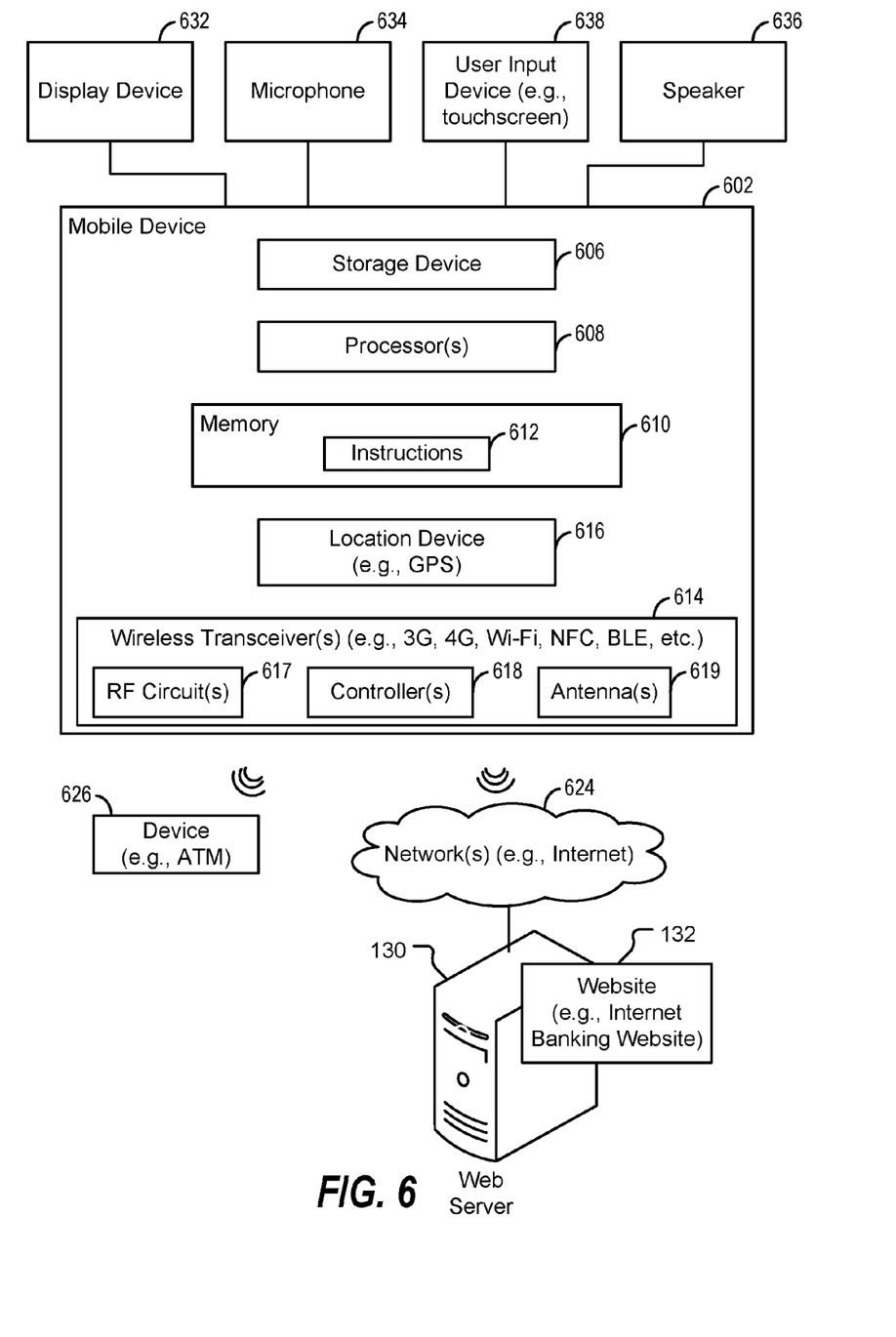
FIG. 6 is a block diagram of an illustrative aspect of a mobile device operable to support methods, apparatuses, and computer-readable storage devices disclosed herein.

Referring to FIG. 6, an illustrative example of a mobile device 602 is shown. The mobile device 602 may be configured to perform one or more of the functions and methods described above with reference to FIGS. 1-5.

The mobile device 602 includes a computer-readable storage device 606, one or more processors 608 (e.g., a central processing unit (CPU), a digital signal processor (DSP), a graphics processing unit (GPU), etc.) and a memory 610. The storage device 606 may be implemented as read-only memory (ROM), random access memory (RAM), and/or persistent storage, such as a hard disk drive, a flash memory device, or other type of storage device. The memory 610 is configured to store instructions 612 executable by the processor 608 to perform one or more of the functions or methods described above with reference to FIGS. 1-5. The computer-readable storage device 606 is not a signal.

The mobile device 602 also includes a location device 616 (e.g., a GPS transceiver) and one or more wireless transceivers 614 that enable the mobile device 602 to exchange signals with (e.g., receive signals from and/or send signals to) other devices. Each wireless transceiver 614 may include or be coupled to radio frequency (RF) circuitry 617, a controller 618, and/or an antenna 619. In illustrative examples, the wireless transceivers 614 include a third generation (3G) transceiver, a fourth generation (4G) transceiver, a Wi-Fi transceiver, a near field communication (NFC) transceiver, a BLUETOOTH (BLUETOOTH is a registered trademark of Bluetooth SIG, Inc. of Kirkland, Wash., USA) or BLUETOOTH low energy (BLE) transceiver, or any combination thereof. In the example of FIG. 6, the mobile device 602 is configured to utilize one or more of the wireless transceivers 614 for direct peer-to-peer communication and communication via one or more networks 624, such as the internet. To illustrate, the mobile device 602 may communicate with an external device 626 (e.g., an automated teller machine (ATM) for contact-less ATM authentication) via a peer-to-peer wireless channel (e.g., BLUETOOTH, BLE, or NFC) and may communicate with the web server 130 hosting the website 132 via a cellular or Wi-Fi wireless channel.

In the example of FIG. 6, the mobile device 602 includes or is coupled to input devices and output devices. For example, the mobile device 602 may include or may be coupled to a display device 632, a microphone 634, a speaker 636, and/or a user input device 638 (e.g., a touchscreen). It should be noted that, while illustrated as outside of the mobile device 602, one or more of the devices 632-638 may be integrated into a housing of the mobile device 602, such as in the case of a mobile phone or tablet computer.

The illustrations and aspects of the disclosure described herein are intended to provide a general understanding of the disclosure and are not intended to exhaustively illustrate all possible aspects, some of which may incorporate substitute arrangements to achieve the same or similar objectives. The present disclosure covers any and all subsequent adaptations or variations of aspects described herein.

It is to be understood that the figures may not be drawn to scale, and the Abstract is not to be used to interpret or limit the scope or meaning of the claims. In addition, the use of the terms invention, embodiment, aspect, or example do not require that the described features be grouped together. The disclosure is not to be interpreted as intending any claimed aspect, example, or embodiment to require more elements than recited in a claim.

The subject matter described herein is thus illustrative rather than restricting, and the claims are intended to cover all falling within the scope of the present disclosure. To the maximum extent allowed by law, the scope of the present disclosure is to be determined by the broadest permissible interpretation of the following claims (which are hereby incorporated into the detailed description) and their equivalents, and shall not be restricted or limited by the foregoing detailed description.

What is claimed:

1. A mobile device comprising:
   a wireless transceiver;
   a processor;
   a display device; and
   a memory storing instructions executable by the processor to perform operations comprising:
      receiving, at a native application, access credential data;
      providing the access credential data from the native application to a headless browser, the headless browser comprising a web browser not having a corresponding displayed graphical user interface;
      initiating a secured connection via the wireless transceiver from the headless browser to a remote server that hosts a website;
      sending, by the headless browser via the secured connection, the access credential data to the remote server;
      receiving first web page data of the website from the remote server via the secured connection;
      parsing the first web page data to identify user-specific data;
      sending the user-specific data to the native application for display in a graphical user interface at the display device, wherein the graphical user interface of the native application includes information based on virtual application programming interface (API) fingerprint data associated with the website, and wherein the virtual API fingerprint data indicates a change to the website subsequent to a previous connection to the website and that indicates service pathways associated with a log in, an authentication, an operation at the remote server, or a combination thereof;
      receiving a user command via a user input device;
      sending, by the headless browser via the secured connection, transaction data to the remote server to modify secured data based on the user command; and
      receiving, by the headless browser via the secured connection, a confirmation of the modification of the secured data.

2. The mobile device of claim 1, wherein the secured connection comprises a secure sockets layer (SSL) connection.

3. The mobile device of claim 1, wherein the website includes content formatted for presentation on a desktop computer or a laptop computer.

4. The mobile device of claim 1, wherein the website includes content formatted for presentation on mobile devices.

5. The mobile device of claim 1, wherein sending the access credential data to the remote server emulates a request to login to the website from a non-headless browser.

6. The mobile device of claim 1, further comprising a location device, the display device, and a user input device, and wherein the wireless transceiver includes or is coupled to radio frequency (RF) circuitry, a controller, an antenna, or any combination thereof.

7. The mobile device of claim 1, wherein the native application enables, via the headless browser, a read operation with respect to secured data, a write operation with respect to secured data, or both.

8. The mobile device of claim 7, wherein the native application enables access to peer-to-peer fund transfer services, contact-less automated teller machine (ATM) authentication, or both.

9. The mobile device of claim 1, wherein code corresponding to the native application includes code corresponding to the headless browser.

10. The mobile device of claim 1, wherein the native application is configured to access the headless browser via at least one web browsing software library.

11. The mobile device of claim 1, wherein the native application is configured to access an instance of the headless browser via one or more application programming interface (API) calls to an operating system of the mobile device.

12. The mobile device of claim 1, wherein the graphical user interface of the native application includes branding for a specific institution.

13. The mobile device of claim 1, wherein the remote server is configured, without relying on an application programming interface, to support access to secure data on the remote server.

14. A method of operation at a mobile device, the method comprising:
during execution of a native application at the mobile device:
receiving, at the native application, access credential data;
providing the access credential data from the native application to a headless browser, the headless browser comprising a web browser not having a corresponding displayed graphical user interface;
initiating a secured connection from the headless browser to a remote server that hosts a website;
sending, by the headless browser via the secured connection, the access credential data to the remote server;
receiving first web page data of the website from the remote server via the secured connection;
parsing the first web page data to identify user-specific data;
displaying the user-specific data in a graphical user interface of the native application, wherein the graphical user interface of the native application includes information based on virtual application programming interface (API) fingerprint data associated with the website, and wherein the virtual API fingerprint data indicates a change to the website subsequent to a previous connection to the website and that indicates service pathways associated with a log in, an authentication, an operation at the remote server, or a combination thereof;
receiving a user command via a user input device;
sending, by the headless browser via the secured connection, transaction data to the remote server to modify secured data based on the user command; and
receiving, by the headless browser via the secured connection, a confirmation of the modification of the secured data.

15. The method of claim 14, wherein identifying the user-specific data comprises accessing a mapping between the native application and the website.

16. The method of claim 15, wherein the mapping is determined based on a scraping operation performed on the website, through javascript injection, or both.

17. A method of operation at a mobile device having connectivity to a remote server, the remote server configured, without relying on an application programming interface, to support access to secure data on the remote server, the method comprising:
during execution of a native application at the mobile device:
initiating a secured connection from a headless browser to the remote server that hosts a website, the headless browser comprising a web browser without a display of a graphical user interface;
receiving, at the native application, access credential data;
providing the access credential data from the native application to the headless browser;
sending, by the headless browser via the secured connection, the access credential data to the remote server;
receiving first web page data of the website from the remote server via the secured connection;
parsing the first web page data to identify user-specific data;
displaying the user-specific data in a graphical user interface of the native application, wherein the graphical user interface of the native application includes information based on virtual application programming interface (API) fingerprint data associated with the website, and wherein the virtual API fingerprint data indicates a change to the website subsequent to a previous connection to the website and that indicates service pathways associated with a log in, an authentication, an operation at the remote server, or a combination thereof;
receiving a user command via a user input device;
sending, by the headless browser via the secured connection, transaction data to the remote server to modify secured data based on the user command; and
receiving, by the headless browser via the secured connection, a confirmation of the modification of the secured data.

18. A computer-readable storage device storing instructions that, when executed by a processor, cause the processor to perform operations comprising:
receiving, at a native application, access credential data;
providing the access credential data from the native application to a headless browser, the headless browser comprising a web browser not having a corresponding displayed graphical user interface;
initiating a secured connection from the headless browser to a remote server that hosts a website;
sending, by the headless browser via the secured connection, the access credential data to the remote server;
receiving first web page data of the website from the remote server via the secured connection;
parsing the first web page data to identify user-specific data;
displaying the user-specific data in a graphical user interface of the native application, wherein the graphical user interface of the native application includes information based on virtual application programming interface (API) fingerprint data associated with the website, and wherein the virtual API fingerprint data indicates a change to the website subsequent to a previous connection to the website and that indicates service pathways associated with a log in, an authentication, an operation at the remote server, or a combination thereof;

receiving a user command via a user input device;

sending, by the headless browser via the secured connection, transaction data to the remote server to modify secured data based on the user command; and receiving, by the headless browser via the secured connection, a confirmation of the modification of the secured data.

* * * * *